(12) United States Patent
Boberg et al.

(10) Patent No.: US 8,769,076 B2
(45) Date of Patent: Jul. 1, 2014

(54) METHODS AND SYSTEMS FOR PRESENCE PUBLICATION USING SIP REGISTER FEATURE TAGS

(75) Inventors: Christer Boberg, Tungelsta (SE); Bo Astrom, Stockholm (SE); Mikael Klein, Huddinge (SE); Sofie Lassborn, Sollentuna (SE); Anders Lindgren, Älvsjö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 15 days.

(21) Appl. No.: 13/372,725

(22) Filed: Feb. 14, 2012

(65) Prior Publication Data

US 2012/0215928 A1    Aug. 23, 2012

Related U.S. Application Data

(60) Provisional application No. 61/442,505, filed on Feb. 14, 2011.

(51) Int. Cl.
*G06F 15/173*       (2006.01)
(52) U.S. Cl.
USPC .......................................... 709/223

(58) Field of Classification Search
USPC .......................................... 709/223, 224, 227
See application file for complete search history.

(56) References Cited

U.S. PATENT DOCUMENTS

| | | | |
|---|---|---|---|
| 2005/0255811 A1* | 11/2005 | Allen et al. | 455/78 |
| 2006/0085678 A1* | 4/2006 | Bouat | 714/12 |
| 2006/0253873 A1* | 11/2006 | Lim et al. | 725/62 |
| 2008/0215736 A1* | 9/2008 | Astrom et al. | 709/226 |
| 2010/0223328 A1* | 9/2010 | Haataja et al. | 709/203 |
| 2012/0215928 A1* | 8/2012 | Boberg et al. | 709/227 |

\* cited by examiner

*Primary Examiner* — Lance L Barry
(74) *Attorney, Agent, or Firm* — Patent Portfolio Builders PLLC (57) ABSTRACT

Systems and methods for publishing presence information can be performed to reduce the amount of signaling associated with presence publication. A method for publishing presence service information to a presence server includes: receiving, at a registrar node, a session initiation protocol (SIP) message originated by a user equipment (UE) over the air interface; and transmitting a third party register message based upon the received SIP message, from the registrar node, toward a presence server using network signaling, wherein the third party register message includes at least one of information associated with the user of the UE, capabilities of the UE and presence related services offered by the UE.

18 Claims, 8 Drawing Sheets

METHODS AND SYSTEMS FOR PRESENCE PUBLICATION USING SIP REGISTER FEATURE TAGS

RELATED APPLICATIONS

The present application is related to, and claims priority from, the U.S. Provisional Application Ser. No. 61/442,505, entitled "Presence Publication Using SIP Register Feature Tags", filed on Feb. 14, 2011, the disclosure of which is incorporated herein by reference.

TECHNICAL FIELD

The present invention generally relates to communication systems, devices, software and methods and, more particularly, to mechanisms and techniques for publishing presence services.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, handheld computers, personal digital assistants (PDAs), etc. also allow the users to communicate via e-mail, video conferencing, IM, etc. Mobile telephones have conventionally served as voice communication devices, but through technological advancements they have recently proved to be effective devices for communicating data, graphics, etc. Wireless and landline technologies continue to merge into a more unified communication system, as user demand for seamless communications across different platforms increases.

Many communication applications allow for real-time or near real-time communication that falls outside of the traditional voice communication associated with wireline and wireless telephone communications. Chat sessions, instant messaging, Short Message Service (SMS), video conferencing, are a few such communication vehicles. Many of these types of communications are expected to become increasingly popular, particularly in view of the proliferation of wireless devices and continual technological breakthroughs.

In order to implement such technologies, the "presence" technology is used to determine the location, willingness to communicate, and other parameters relating to real-time or near real-time communications. The presence technology generally refers to applications and services that facilitate location and identification of one or more endpoints to such communication links. For example, if a first user of a wireless, handheld device, intends to initiate an IM session with a second IM user, presence services may be used to present the second user's willingness to receive IM messages. Presence services are an integral part of third generation (3G) wireless networks, and are intended to be employed across a wide variety of communication devices.

Presence information may be created at a presence server or an associated system. Presence information may be a status indicator that conveys the ability and willingness of a potential user to communicate with other users. The presence server may provide the presence information for distribution to other users (called watchers) to convey the availability of the user for communication. Presence information is used in many communication services, such as IM and recent implementations of voice over IP communications.

More specifically, a user client may publish a presence state to indicate its current communication status. This published state informs others that wish to contact the user of his availability and willingness to communicate. One use of presence is to display an indicator icon on IM clients, for example a choice of a graphic symbol with an easy-to-convey meaning, and a list of corresponding text descriptions of each of the states. This is similar to the "on-hook" or "off-hook" state of a fixed telephone.

Common states regarding the user's availability are "free for chat", "busy", etc. Such states exist in many variations across different modern instant messaging clients. However, the standards support a rich choice of additional presence attributes that may be used for presence information, such as user mood, location, or free text status.

Presence service is a network service which accepts, stores and distributes presence information. The presence service may be implemented as a single server or may have an internal structure involving multiple servers and proxies. There may be complex patterns of redirection and proxying while retaining logical connectivity to a single presence service. Also presence service may be implemented as direct communication among presentity and watchers, i.e., a server is not required.

A number of entities may be implemented in a presence service architecture. One of these entities is the presentity, which is an entity that provides presence information. Another entity is the presence server, which receives presence information from presentities. The watcher is an entity that is interested in the presence information.

The presence information (e.g., location, willingness to communicate at a certain time or with certain users, etc.) may be collected and utilized by presence servers, which may notify authorized "watchers" who are interested in certain presence information. Watcher applications may be implemented in wireline and/or wireless terminals to obtain presence information from the presence servers about other users. This may come in the form of a notification, issued to the watcher by the presence server.

Notifications to users/watchers that a targeted user/device has become available may be sent as complete or partial presence information. In other words, there are a number of different pieces of presence information that can be associated with the totality of the presence information. In a similar manner to the presence information and associated structure, there are location servers and location information regarding the users. The location information may include geographical location information.

In the Internet Protocol Multimedia Subsystem (IMS)/Session Initiation Protocol (SIP) standard solutions SIP Publish is used to upload presence information to a presence server. Recently 3GPP has introduced Service Identification for communication services (CoSe) and IMS applications (IARI). Feature tags included in the SIP Register message includes the communication services, IMS applications and other capabilities that are available on the registering terminal. This information is equivalent to the service element information that is conveyed in the presence publication.

When a terminal is powered-on, it normally first sends a SIP Register message over an air interface to the registrar, e.g., home subscriber server (HSS), and thereafter sends a SIP Publish message to publish its available services to the Presence server. In fact, there may be several publication messages sent by a UE over the air interface being powered on since many terminal implementations often require each application to send a separate SIP publish with service specific data.

IMS and SIP solutions need to be optimized and presence is one of the most message generating services, thus causing a substantial load on radio- and core networks, as well the peers in the signalling (terminal and server). In particular, the transmission of numerous SIP Publish messages by a terminal may unduly load the air interface of radiocommunication systems. Accordingly, it would be desirable to provide devices, systems and methods for presence and publication of presence-related services that avoid the afore-described problems and drawbacks.

SUMMARY

The following exemplary embodiments provide a number of advantages and benefits relative to existing presence and/or location systems, devices and methods including, for example, the possibility to reduce the amount of signaling associated with presence publication, e.g., over the air interface. It will be appreciated by those skilled in the art, however, that the invention is not limited to those embodiments which produce any or all of these advantages or benefits and that other advantages and benefits may be realized depending upon the particular implementation.

According to an exemplary embodiment, there is a method for publishing presence service information to a presence server, the method comprising: receiving, at a registrar node, a session initiation protocol (SIP) message originated by a user equipment (UE) over the air interface; and transmitting a third party register message based upon the received SIP message, from the registrar node, toward a presence server using network signaling, wherein the third party register message includes at least one of information associated with a user of the UE, capabilities of the UE and presence related services offered by the UE.

According to an exemplary embodiment, there is a registrar node for publishing presence service information to a presence server, the registrar node comprising: input/output circuitry configured to receive a session initiation protocol (SIP) message originated by a user equipment (UE) over the air interface; and the input/output circuitry configured to transmit a third party register message to a presence server using network signaling, wherein the third party register message includes at least one of information associated with a user of the UE, capabilities of the UE and presence related services offered by the UE.

According to an exemplary embodiment, there is a presence server for publishing presence service information, the presence server comprising: an input/output circuitry configured to receive a third party register message to a presence server using network signaling, wherein the third party register message includes at least one of information associated with a user of a user equipment (UE), capabilities of the UE and presence related services offered by the UE; and a memory configured to store at a presence server, information from the third party register message as presence information associated with the UE.

According to an exemplary embodiment, there is a user equipment (UE) for publishing presence service information to a presence server, the UE comprising: a transceiver configured to transmit a session initiation protocol (SIP) register message toward a registrar node; and the UE configured to perform the functions of a presentity, wherein the UE does not transmit an initial SIP PUBLISH message and a final SIP PUBLISH message associated with initialization and termination of service state.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of presence servers and associated nodes in communication systems. However, the embodiments to be discussed next are not limited to these systems but may be applied to other communication systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

According to exemplary embodiments, it is possible to limit the amount of signalling, e.g., by terminals over an air interface, by avoiding having to send at least the initial and final SIP Publication messages, as well as potentially those SIP Publish messages which would come between the initial and final SIP Publish messages, e.g., when the capabilities of the device changes or when the user decided to inactivate a feature.

Figure 1:
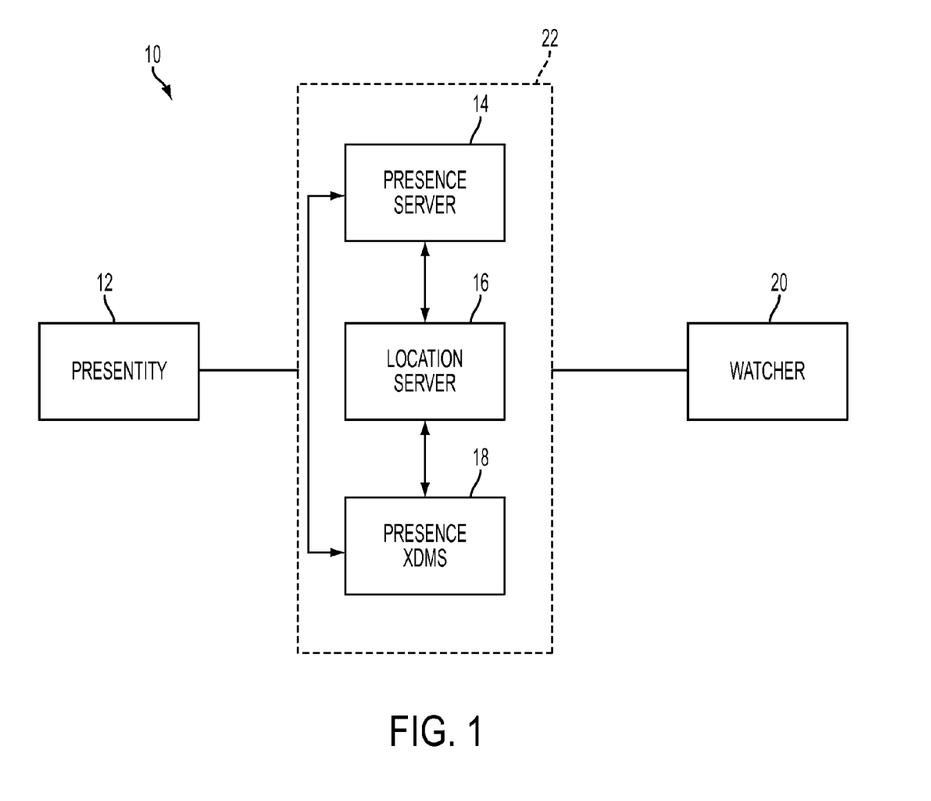
FIG. 1 is a schematic diagram of a communication system including a user terminal and various servers.

In order to provide some context for such embodiments, and as shown in FIG. 1, a general communication system that uses location and presence data may include a presentity 12, e.g., a user equipment (UE), a presence server 14, an (optional) location server 16, a presence extensible markup language (XML) data management server (XDMS) server 18, and a watcher 20. The presence server 14, the location server 16, and the presence XDMS server 18 may be part of a single server 22 or may be implemented as separate servers located at separate physical locations. The presence server 14, the location server 16, and the presence XDMS server 18 may communicate directly to each other or via one of these servers as shown in FIG. 1. The communication path may be wireline or wireless. The presentity 12 and the watcher 20 may communicate with each of the presence server 14, the location server 16, and the presence XDMS server 18 or may communicate via a single port (not shown) with the single server 22. The communication of the presentity 12 and the watcher 20 with the servers may be wireline or wireless.

According to an exemplary embodiment, a registrar node (e.g., a home subscriber server (HSS) or call session control function (CSCF)) can send the register information to the presence server 14 as a $3^{rd}$ party register message including the feature tags with the available services for, e.g., a presentity 12 which has recently powered-on. The presence server 14 will then use the information in the $3^{rd}$ party register message to create presence information according to, for example, the standard used in the system 10 (such as presence information data format (PIDF)) which is then sent to the watchers 20 of the presentity 12. The use of such $3^{rd}$ party register messages from the registrar node to the presence server constitutes network signalling, e.g., signalling which does not occur over the air interface, instead of SIP Publish messages which would otherwise be transmitted over the air interface. The use of SIP Publish messaging may still be used as a complement according to some embodiments, e.g., when a presentity or UE changes its state while still registered with a network, but initialization and termination of service state can be handled via the SIP registration in the network as will be described below.

When $3^{rd}$ party register messages are used according to embodiments from the registrar node to the presence server, the presence server should preferably have the functionality needed to map the capabilities and service identification(s) provided in the Register message (e.g., IMS Communications Service Identifier (ICSI), IMS application reference identifier (IARI) and other capabilities) to attributes used in the Presence information (.e.g., attributes in the presence standard which is used in the system, e.g., PIDF). For example, any ICSI values, which define what services the user/client is capable of using, should be visible as a service name in the presence information including, for example, a Feature Tag for ICSI reporting Multimedia Telephony, e.g., "+g.3gpp.icsi_ref="urn % 3Aurn-xxx % 3A3gpp-service.ims.icsi.mmtel", and/or a Service Id in Presence Document: (as normally reported by a Presence Client), e.g., "<op:service-id>3gpp.multimediatelephony</op:service-id>".

An alternative solution is to let the registrar node (e.g., HSS or CSCF) transform the information received in the SIP Register message from the UE, and generate a SIP PUBLISH message to the presence server. This solution is herein referred to as the Registar-Proxy solution.

The SIP publication method/message uses Etags to handle multiple publications for the same presentity 12 so that a publication can be added/modified/deleted/refreshed without affecting other publications created by other presence sources such as e.g., a presence network agent (PNA). When $3^{rd}$ party register messaging in the network is instead used to convey presence data according to embodiments, this functionality should be maintained. One option is to enable the presence server 14 to use static etags for publications done via this method that do not collide with other possible publication performed via SIP Publish. The presence server 14 can also handle $3^{rd}$ party register messages coming from multiple devices which suggests that a specific "static" etag used by the presence server can be connected to a certain contact address, that is a de-registering of one terminal can only remove the presence data for that particular contact and not for other contacts. The actual mapping of the feature tag information, e.g., information associated with a capability of the UE, to standard presence format is done by the presence server 14 preferably when it creates the static publication. The manner in which this mapping is performed can be implementation specific, but the mapping should preferably be configurable.

One interesting feature of embodiments described herein is the ability to map device/service related data conveyed via $3^{rd}$ Party register and service related data conveyed via SIP Publish. Composition makes it possible to merge service elements created via $3^{rd}$ party register and SIP publish, but it is also possible to tie a service element conveyed via SIP publish to a device element conveyed via $3^{rd}$ party register if the SIP publish includes a contact element or a Globally Routable User Agent URI (GRUU) as part of the presence information. This merging of service elements create via $3^{rd}$ party register and SIP publish can be performed at the presence server 14.

Figure 2:
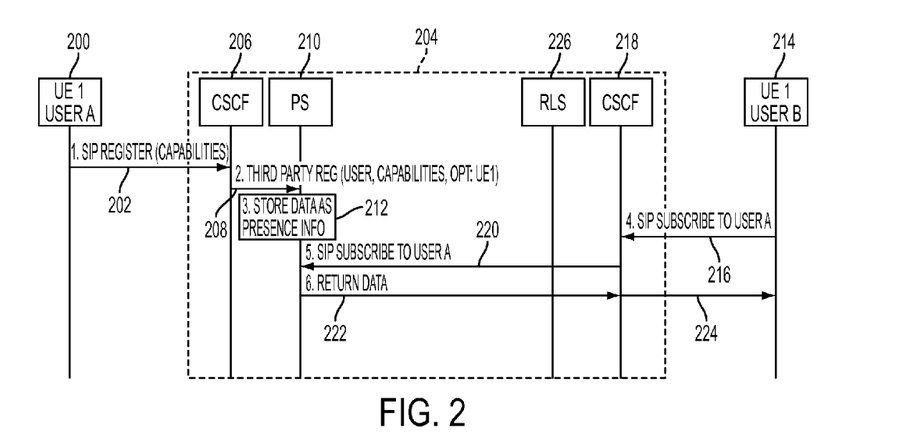
FIGS. 2-6 are signaling diagrams depicting various aspects of presence server publication according to different exemplary embodiments.

To further illustrate various embodiments, signalling diagrams are presented as FIGS. 2-6. FIG. 2 depicts signalling associated with presence services provided by a single User via a single device 200. Therein, e.g., at power-on, UE 200 transmits a SIP Register message 202 towards the network 204 over the air interface, e.g., via an eNodeB or the like (not shown). The SIP Register message is forwarded to a registrar node, in this example CSCF 206. However, unlike conventional presence publication signalling, UE 200 does not transmit a SIP Publish message over the air interface toward the presence server 210. Instead CSCF 206 transmits a third party register message 208 toward the presence server 210 which includes information about the user associated with UE 200, capabilities of UE 200, and/or presence-related services offered by the presentity 200. The presence server 210 then stores this data as presence information associated with UE 200 at step 212. Subsequently, a watcher, UE 214, can subscribe to the presence service(s) provided by UE 200, e.g., via SIP Subscribe signal/message 216. Message 216 is forwarded by CSCF 218 to the presence server 210 via signal 220 which can, if UE 214 is an authorized subscriber to a presence service provided by UE 200, return data associated with that service via signals 222 and 224. An Resource Locator Server (RLS) 226 is also shown in FIG. 2, and described below in more detail in other signalling embodiments.

Figure 3:
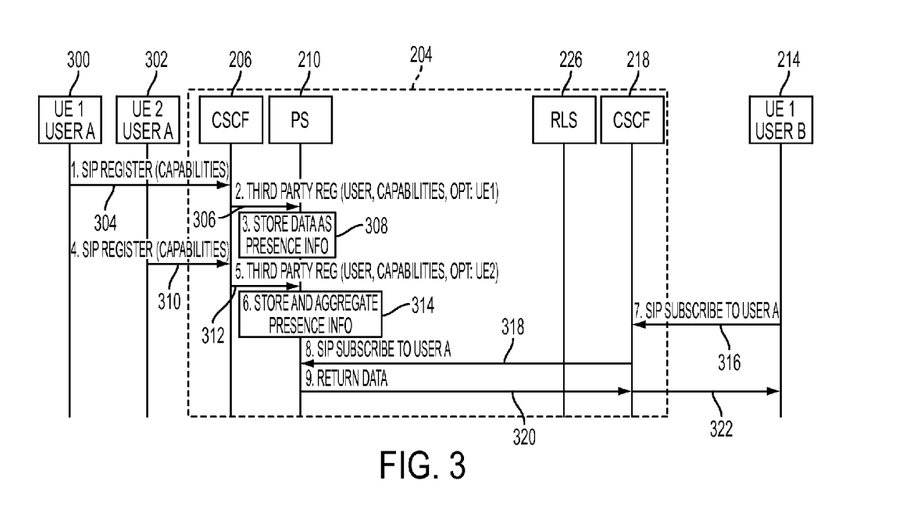

FIG. 3 depicts signalling associated with presence services being provided by a single user having two different devices (UEs) 300 and 302. Therein, the nodes which are replicated from the embodiment of FIG. 2 are referenced using the same reference numbers. As in the previous embodiment when, for example, device 300 is powered-on, it transmits a SIP Register message 304 over the air interface toward CSCF 206. CSCF 206, in turn, transmits a third party register message 306 over a network interface to presence server 210 which stores the information as presence data at step 308. When device 302, associated with the same user as device 300, is powered-on, it transmits its own SIP Register message 310 toward its registrar node over the air interface. The CSCF 206 transmits a corresponding third party register message 312 to presence server 210. Presence server 210, recognizing that this is another device associated with the same user, aggregates and stores the information received in signal 312 with that which was previously stored in step 308 as aggregated presence information associated with User A, as indicated by step 314. Subsequently, when UserB/UE 214 subscribes to one or more presence services associated with User A, signals 316-322 are transmitted, which are similar to signals 216, 220, 222 and 224 described above.

Figure 4:
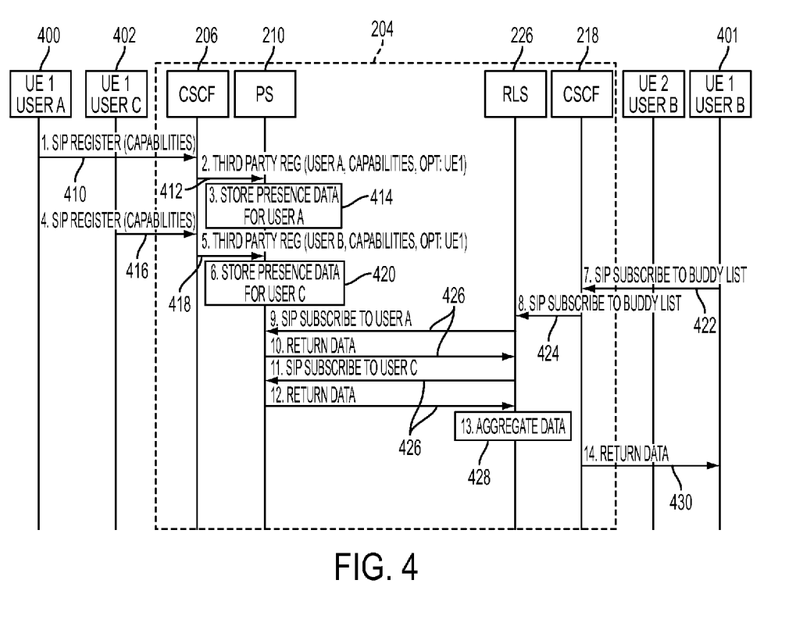

FIG. 4 illustrates signalling associated with an embodiment where a user subscribes to a buddylist including several users 400, 402, and each user has a single device. Note that the same general signaling model applies when a user has multiple devices except that the presence server 210 will aggregate the info as in FIG. 3. As in the previous embodiments when, for example, device 400 is powered-on, it transmits a SIP Register message 410 over the air interface toward CSCF 206. CSCF 206, in turn, transmits a third party register message 412 over a network interface to Presence server 210 which stores the information as presence data at step 414. When device 402, associated with a different user than device 400, is powered-on, it transmits its own SIP Register message 416 toward its registrar node over the air interface. The CSCF 206 transmits a corresponding third party register message 418 to Presence server 210 which stores User C's presence information at step 410. When User B subscribes to the buddy list via signals 422, 424, the RLS 226 operates to gather the data associated with the buddylist via signals referenced collectively by 426, and aggregates that data 428 before returning it to UE 410 via signal.

Figure 5:
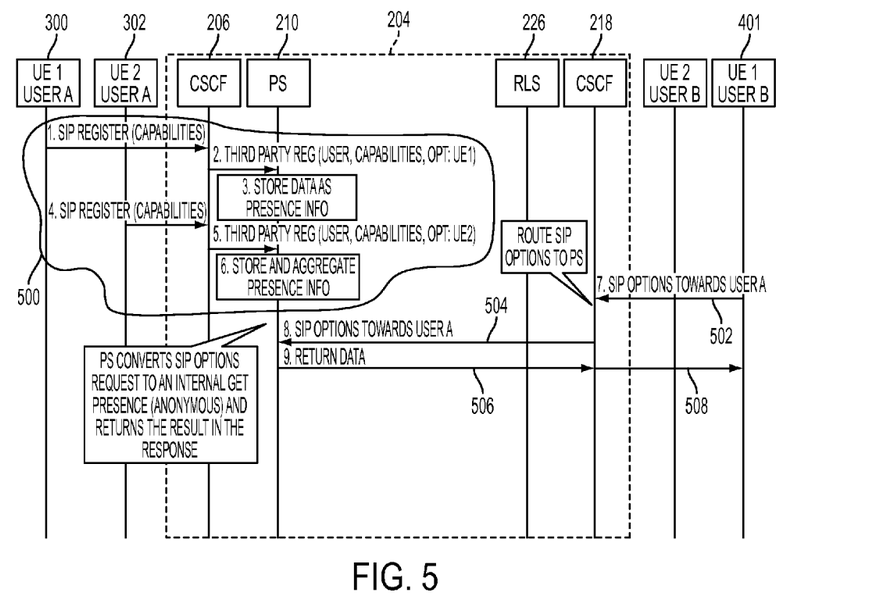

An alternative solution is to use SIP OPTIONS to fetch the information as shown in the signaling diagram of FIG. 5. This figure illustrates the same scenario as described above with respect to FIG. 3, i.e., the same mechanisms are used to provide the presence information to the presence server 210 via the SIP REGISTER messaging, etc., referred to generally by reference numeral 500. However, in this embodiment, SIP OPTIONS messages 502 and 504 are used instead of SIP SUBSCRIBE, by the watcher User B. The presence server 210 converts the SIP OPTIONS message 504 into an internal Get Presence request and returns the requested data via signals 506 and 508.

Figure 6:
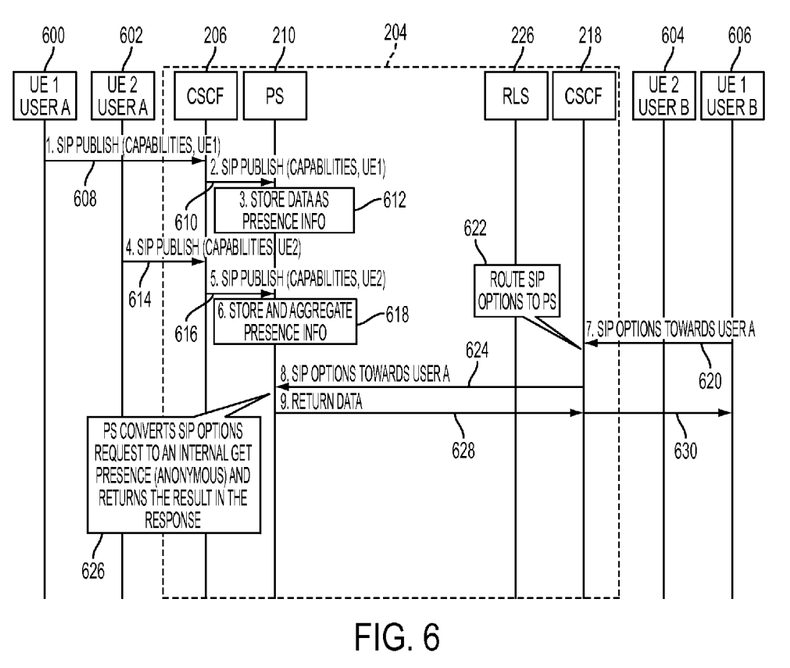

FIG. 6 is a signalling diagram showing yet another embodiment wherein a single user (User A), having two different devices 600, 602, provides SIP presence information to the Presence server 210 using SIP PUBLISH messaging. A watcher (User B), also having two devices 604, 606, subscribes to the presence information of User A using SIP OPTION messaging. Initially, a SIP PUBLISH message 608 is transmitted from UE1 600 to the CSCF 206 over the air interface. The CSCF 206, acting as the registrar node, transmits the SIP PUBLISH message 610 to the presence server 210. Upon receipt of message 610, the presence server 210 stores the data as presence information as shown in block 612. A SIP PUBLISH message 614 is transmitted from UE2 602 (which is from the same user as UE1 600) to the CSCF 206 over the air interface. The CSCF 206 then transmits the SIP PUBLISH message 616 to the presence server. Upon receipt of message 616, the presence server 210 stores and aggregates the data as presence information as shown in block 618.

At some point in time, a watcher, UE1 of User B 606, decides to subscribe to the presence information of User A. UE1 of User B 606 transmits a SIP OPTIONS message 620 towards User A which is received by CSCF 218. The CSCF 218 decides to route the SIP OPTIONS message toward the presence server 210 as shown in block 622. The SIP OPTIONS message 624 is then received by the presence server 210. In this exemplary embodiment, the presence server 210 converts the SIP OPTIONS message to an internal get presence (anonymous) as shown in block 626. The obtained information is then returned in messages 628 and 630 to the UE1 of User B 606 via the CSCF 218.

Among other advantages and benefits associated with these embodiments, it is possible to heavily reduce the amount of messages sent in relation to presence, e.g., over the air interface. Embodiments also make it possible to publish presence from a "non-presence" aware client, as well as to speed up the start-up and termination of the client application.

Terminals that may act as presentities and/or watchers as described in connection with the exemplary embodiments may be desktop/personal computers, workstations, large-scale computing terminals, wireless terminals, or any other computing device capable of executing presence awareness applications. The wireless terminals may include devices such as wireless/cellular telephones, personal digital assistants (PDAs), or other wireless handsets, as well as portable computing devices. The mobile terminals may utilize computing components to control and manage the conventional device activity as well as the functionality provided by the exemplary embodiments. Hardware, firmware, software or a combination thereof may be used to perform the various methods and techniques described in this document.

According to an exemplary embodiment, there is a method for publishing presence service information to a presence server, the method comprising: transmitting, by a registrar node, a third party register method including the presence server information toward the presence server. The registrar node can, for example, be an HSS or a CSCF.

According to another exemplary embodiment, a method for publishing presence service information to a presence server can include the steps of: receiving, by the presence server, a third party register method including the presence server information and storing the presence server information.

According to yet another exemplary embodiment, a method for publishing presence service information to a presence server can include the steps of: transmitting, by a UE, a SIP Register message including an indication of the UE's capabilities toward a registrar node. The registrar node can, for example, be an HSS or CSCF. The UE can, subsequent to transmitting the SIP Register message, not transmit any SIP Publish messages associated with its presence services. Alternatively, the UE can avoid transmitting an initial SIP Publish message and a final SIP Publish message, but can transmit intermediate SIP Publish messages associated with changes in its presence-related state(s).

The afore-described exemplary methods associated with a registrar node, presence server and UE, respectively, can also be embodied in respective devices or structures including, among other things processors which are configured to perform the described functions.

Figure 7:
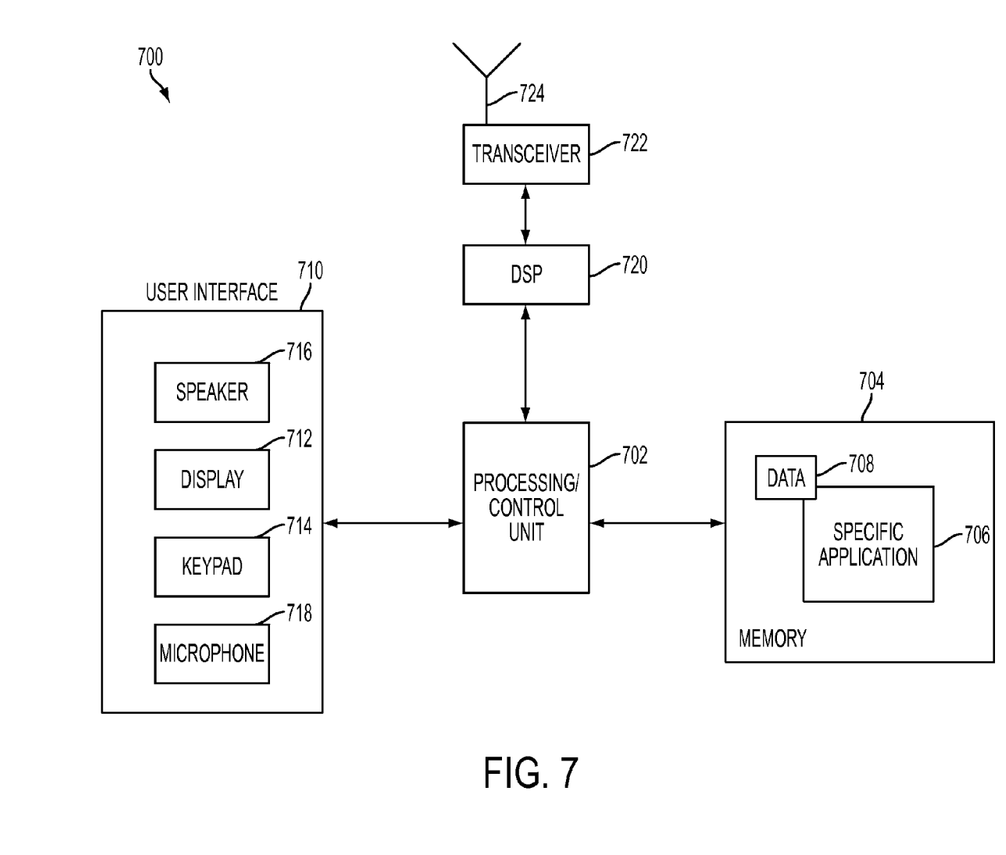
FIG. 7 is a schematic diagram of a user terminal according to an exemplary embodiment.

For purposes of illustration and not of limitation, an example of a representative mobile terminal computing system capable of carrying out operations in accordance with the exemplary embodiments is illustrated in FIG. 7. It should be recognized, however, that the principles of the present exemplary embodiments are equally applicable to standard computing systems.

The exemplary mobile computing arrangement 700 may include a processing/control unit 702, such as a microprocessor, reduced instruction set computer (RISC), or other central processing module. The processing unit 702 need not be a single device, and may include one or more processors. For example, the processing unit 702 may include a master processor and associated slave processors coupled to communicate with the master processor.

The processing unit 702 may control the basic functions of the mobile terminal as dictated by programs available in the storage/memory 704. More particularly, the storage/memory 704 may include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the mobile computing arrangement 700 via data signals, such as being downloaded electronically via a network, such as the Internet.

One of the programs that may be stored in the storage/memory 704 is a specific program 706. As previously described, the specific program 506 may interact with a presence server, e.g., via a registrar node, to provide presence service information of one or more presentities. The program 706 and associated features may be implemented in software and/or firmware operable by way of the processor 702. The program storage/memory 704 may also be used to store data 708 associated with the present exemplary embodiments. In one exemplary embodiment, the programs 706 and data 708 are stored in non-volatile electrically-erasable, programmable ROM (EEPROM), flash ROM, etc. so that the information is not lost upon power down of the mobile terminal 700.

The processor 702 may also be coupled to user interface 710 elements associated with the mobile terminal. The user interface 710 of the mobile terminal may include, for example, a display 712 such as a liquid crystal display, a keypad 714, speaker 716, and a microphone 718. These and other user interface components are coupled to the processor 702 as is known in the art. The keypad 714 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The mobile computing arrangement 700 may also include a digital signal processor (DSP) 720. The DSP 720 may perform a variety of functions, including analog-to-digital (N/D) conversion, digital-to-analog (D/A) conversion, speech coding/decoding, encryption/decryption, error detection and correction, bit stream translation, filtering, etc. The transceiver 722, generally coupled to an antenna 724, may transmit and receive the radio signals associated with a wireless device.

The mobile computing arrangement 700 of FIG. 7 is provided as a representative example of a computing environment in which the principles of the present exemplary embodiments may be applied. From the description provided herein, those skilled in the art will appreciate that the present invention is equally applicable in a variety of other currently known and future mobile and fixed computing environments. For example, the specific application 706 and associated features, and data 708, may be stored in a variety of manners, may be operable on a variety of processing devices, and may be operable in mobile devices having additional, fewer, or different supporting circuitry and user interface mechanisms. It is noted that the principles of the present exemplary embodiments are equally applicable to non-mobile terminals, i.e., landline computing systems.

Figure 8:
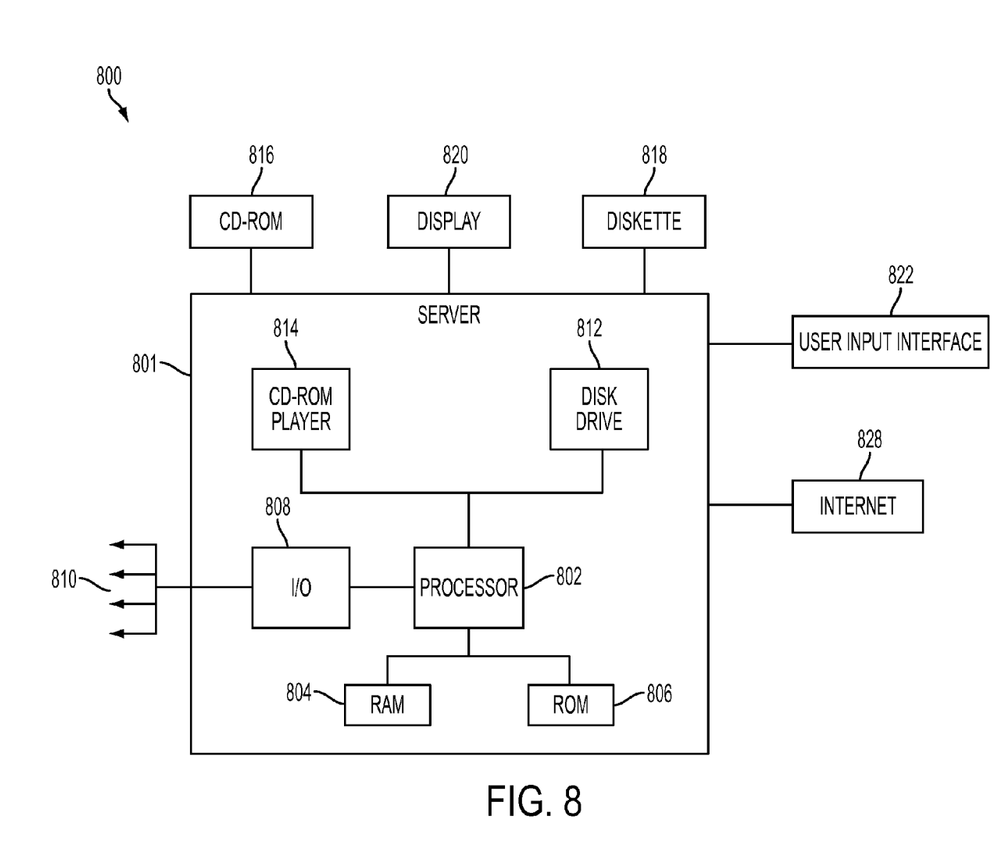
FIG. 8 is a schematic diagram of a server according to an exemplary embodiment.

The presence server, registrar node or other systems for handling presence information in connection with the present exemplary embodiments may be any type of computing device capable of processing and communicating presence information. An example of a representative computing system capable of carrying out operations in accordance with the servers of the exemplary embodiments is illustrated in FIG. 8. Hardware, firmware, software or a combination thereof may be used to perform the various steps and operations described herein. The computing structure 800 of FIG. 8 is an exemplary computing structure that may be used in connection with such a system.

The exemplary computing arrangement 800 suitable for performing the activities described in the exemplary embodiments may include a presence server or a registrar node (e.g., HSS, CSCF, etc.). Such a server 801 may include a central processor (CPU) 802 coupled to a random access memory (RAM) 804 and to a read-only memory (ROM) 806. The ROM 806 may also be other types of storage media to store programs, such as programmable ROM (PROM), erasable PROM (EPROM), etc. The processor 802 may communicate with other internal and external components through input/output (I/O) circuitry 808 and bussing 810, to provide control signals and the like. The processor 802 carries out a variety of functions as is known in the art, as dictated by software and/or firmware instructions.

The server 801 may also include one or more data storage devices, including hard and floppy disk drives 812, CD-ROM drives 814, and other hardware capable of reading and/or storing information such as DVD, etc. In one embodiment, software for carrying out the above discussed steps may be stored and distributed on a CD-ROM 816, diskette 818 or other form of media capable of portably storing information. These storage media may be inserted into, and read by, devices such as the CD-ROM drive 814, the disk drive 812, etc. The server 801 may be coupled to a display 820, which may be any type of known display or presentation screen, such as LCD displays, plasma display, cathode ray tubes (CRT), etc. A user input interface 822 is provided, including one or more user interface mechanisms such as a mouse, keyboard, microphone, touch pad, touch screen, voice-recognition system, etc.

The server 801 may be coupled to other computing devices, such as the landline and/or wireless terminals and associated watcher applications, via a network. The server may be part of a larger network configuration as in a global area network (GAN) such as the Internet 828, which allows ultimate connection to the various landline and/or mobile client/watcher devices.

Figure 9:
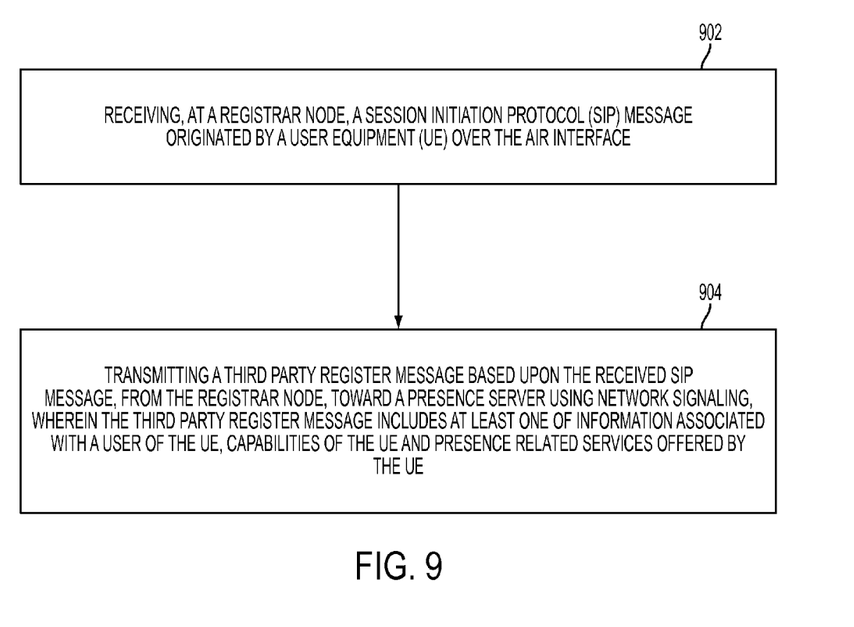
FIG. 9 is a flowchart of a method according to an exemplary embodiment.

Utilizing the above-described exemplary systems according to exemplary embodiments, a method for publishing presence service information to a presence server is shown in the flowchart of FIG. 9. The method includes: receiving, at a registrar node, a session initiation protocol (SIP) message originated by a user equipment (UE) over the air interface at step 902; and transmitting a third party register message based upon the received SIP message, from the registrar node, toward a presence server using network signaling, wherein the third party register message includes at least one of information associated with a user of the UE, capabilities of the UE and presence related services offered by the UE at step 904.

The disclosed exemplary embodiments provide a user terminal, a system, a method and a computer program product for obtaining location data of a certain user. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a general purpose computer or a processor.

What is claimed is:

1. A method for publishing presence service information to a presence server, the method comprising:
   receiving, at a registrar node, a session initiation protocol (SIP) message originated by a user equipment (UE) over the air interface;
   transmitting a register message based upon the received SIP message, from the registrar node, toward a presence server using network signaling, wherein the register message includes at least one of information associated with a user of the UE, capabilities of the UE and presence related services offered by the UE;
   receiving, at the registrar node, one or more SIP PUBLISH messages from the UE over the air interface; and
   transmitting one or more third party messages which include information received in the one or more SIP PUBLISH messages.

2. The method of claim 1, wherein the registrar node is one of a home subscriber server (HSS) or a call session control function (CSCF).

3. The method of claim 1, further comprising:
   storing, at a presence server, information from the register message as presence information associated with the UE.

4. The method of claim 1, wherein the SIP message originated by the UE is a SIP register message which is transmitted by the UE when the UE is powered on.

5. The method of claim 1, further comprising:
   receiving, at the presence server, a SIP OPTIONS message;
   converting the SIP OPTIONS message into an internal get presence request; and
   transmitting data associated with the internal get presence request.

6. The method of claim 1, further comprising:
   aggregating received messages associated with a same presence entity at the presence server.

7. The method of claim 1, wherein the network signaling is not the air interface.

8. A registrar node for publishing presence service information to a presence server, the registrar node comprising:
   input/output circuitry configured to receive a session initiation protocol (SIP) message originated by a user equipment (UE) over the air interface;
   the input/output circuitry configured to transmit a register message to a presence server using network signaling, wherein the register message includes at least one of information associated with a user of the UE, capabilities of the UE and presence related services offered by the UE;
   the input/output circuitry configured to receive one or more SIP PUBLISH messages from the UE over the air interface; and
   the input/output circuitry configured to transmit one or more third party messages which include information received in the one or more SIP PUBLISH messages.

9. The registrar node of claim 8, wherein the registrar node is one of a home subscriber server (HSS) or a call session control function (CSCF).

10. The registrar node of claim 8, wherein the SIP message originated by the UE over the air interface is a SIP register message which is transmitted by the UE when the UE is powered up.

11. The register node of claim 8, wherein the network signalling is not the air interface.

12. A method for publishing presence service information to a presence server, the method comprising:
   receiving, at a registrar node, a session initiation protocol (SIP) message originated by a user equipment (UE) over the air interface;
   transmitting a register message based upon the received SIP message, from the registrar node, toward a presence server using network signaling, wherein the register message includes at least one of information associated with a user of the UE, capabilities of the UE and presence related services offered by the UE;
   receiving, at the presence server, a SIP OPTIONS message;
   converting the SIP OPTIONS message into an internal get presence request; and
   transmitting data associated with the internal get presence request.

13. The method of claim 12, wherein the registrar node is one of a home subscriber server (HSS) or a call session control function (CSCF).

14. The method of claim 12, further comprising:
   storing, at the presence server, information from the register message as presence information associated with the UE.

15. The method of claim 12, wherein the SIP message originated by the UE is a SIP register message which is transmitted by the UE when the UE is powered on.

16. The method of claim 12, further comprising:
   aggregating received messages associated with a same presence entity at the presence server.

17. The method of claim 12, wherein the network signaling is not the air interface.

18. The method of claim 12, further comprising:
   receiving, at the registrar node, one or more SIP PUBLISH messages from the UE over the air interface; and
   transmitting one or more third party messages which include information received in the one or more SIP PUBLISH messages.

* * * * *

UNITED STATES PATENT AND TRADEMARK OFFICE
CERTIFICATE OF CORRECTION

| | | |
|---|---|---|
| PATENT NO. | : 8,769,076 B2 | Page 1 of 1 |
| APPLICATION NO. | : 13/372725 | |
| DATED | : July 1, 2014 | |
| INVENTOR(S) | : Boberg et al. | |

It is certified that error appears in the above-identified patent and that said Letters Patent is hereby corrected as shown below:

On the Title Page, in Item (75), under "Inventors", in Column 1, Line 2, delete "Astrom," and insert -- Åström --, therefor.

In the Specification

In Column 6, Line 30, delete "presentity 200." and insert -- presentity 12. --, therefor.

In Column 9, Lines 34-35, delete "analog-to-digital (ND)" and insert -- analog-to-digital (A/D) --, therefor.

Signed and Sealed this
Twenty-sixth Day of May, 2015

Michelle K. Lee
*Director of the United States Patent and Trademark Office*